(12) United States Patent
Henryson et al.

(10) Patent No.: US 12,301,618 B2
(45) Date of Patent: *May 13, 2025

(54) FUZZY LOGIC MODELING FOR DETECTION AND PRESENTMENT OF ANOMALOUS MESSAGING

(71) Applicant: Wells Fargo Bank, N.A., San Francisco, CA (US)

(72) Inventors: Stacy R. Henryson, Clive, IA (US); Michael Goodwin, Denver, CO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,750

(22) Filed: Mar. 27, 2023

(65) Prior Publication Data

US 2023/0231876 A1    Jul. 20, 2023

Related U.S. Application Data

(63) Continuation of application No. 16/996,396, filed on Aug. 18, 2020, now Pat. No. 11,616,809.

(51) Int. Cl.
| | |
|---|---|
| *G06F 16/25* | (2019.01) |
| *G06F 3/0482* | (2013.01) |
| *G06F 3/0484* | (2022.01) |
| *G06F 16/2458* | (2019.01) |
| *H04L 9/40* | (2022.01) |

(52) U.S. Cl.
CPC ........ *H04L 63/1466* (2013.01); *G06F 3/0482* (2013.01); *G06F 3/0484* (2013.01); *G06F 16/2462* (2019.01); *G06F 16/2468* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 6,122,624 A * | 9/2000 | Tetro | G06Q 20/4014 |
| | | | 705/44 |
| 6,418,436 B1 * | 7/2002 | Degen | G06Q 20/4016 |
| 6,507,866 B1 | 1/2003 | Barchi | |
| 7,337,119 B1 * | 2/2008 | Geschwender | G06Q 40/00 |
| | | | 705/44 |

(Continued)

FOREIGN PATENT DOCUMENTS

| | | | | |
|---|---|---|---|---|
| JP | 6483227 B2 * | 3/2019 | | G06F 21/577 |
| WO | WO-0135301 A1 * | 5/2001 | | G06Q 20/342 |
| WO | WO-2014/071327 A1 | 5/2014 | | |

*Primary Examiner* — Augustine K. Obisesan
(74) *Attorney, Agent, or Firm* — Foley & Lardner LLP

(57) ABSTRACT

Disclosed is an approach that applies a fuzzy logic model that may involve fuzzy-matching a plurality of address fields to determine a common physical address, and determining a number of communiques directed to that address with reference to a threshold that may determine an excessive number of communiques. The plurality of address fields may also be fuzzy-matched to information in a fraud-risk database which may comprise a fraud-risk address. One or more matches may be presented to a user who may adjust the views of the various matches, track various trends within the data, and harmonize the various address fields relating to a physical address.

19 Claims, 5 Drawing Sheets

(56) References Cited

U.S. PATENT DOCUMENTS

| | | | | |
|---|---|---|---|---|
| 8,073,785 B1* | 12/2011 | Candella | | G06Q 40/08 705/76 |
| 8,484,132 B1* | 7/2013 | Christiansen | | G06Q 40/00 705/35 |
| 8,548,910 B1* | 10/2013 | Hamilton | | G06Q 40/02 705/42 |
| 2003/0097330 A1* | 5/2003 | Hillmer | | G06Q 40/03 705/38 |
| 2004/0199592 A1 | 10/2004 | Gould et al. | | |
| 2006/0064374 A1* | 3/2006 | Helsper | | G06Q 30/02 705/39 |
| 2007/0203826 A1* | 8/2007 | Russell | | G06Q 20/4016 705/38 |
| 2007/0299915 A1* | 12/2007 | Shraim | | H04L 63/1491 709/229 |
| 2008/0140576 A1* | 6/2008 | Lewis | | G06Q 30/02 707/999.107 |
| 2008/0288385 A1* | 11/2008 | Geschwender | | G06Q 20/04 705/35 |
| 2010/0251362 A1 | 9/2010 | Gillum et al. | | |
| 2010/0325035 A1* | 12/2010 | Hilgers | | G06Q 10/10 705/325 |
| 2012/0030079 A1* | 2/2012 | Slater | | G06Q 40/123 705/35 |
| 2012/0047053 A1 | 2/2012 | Favreau et al. | | |
| 2013/0031061 A1* | 1/2013 | Jagota | | G06Q 30/01 707/690 |
| 2013/0211985 A1 | 8/2013 | Clark et al. | | |
| 2013/0291099 A1* | 10/2013 | Donfried | | G06Q 30/0637 726/22 |
| 2014/0150097 A1* | 5/2014 | Carvalho | | H04L 63/126 726/22 |
| 2015/0033343 A1 | 1/2015 | Jiang et al. | | |
| 2017/0148025 A1* | 5/2017 | Le | | G06Q 20/4016 |
| 2017/0262850 A1 | 9/2017 | Hammad et al. | | |
| 2017/0289082 A1 | 10/2017 | Shen | | |
| 2018/0024943 A1* | 1/2018 | Xu | | G06F 12/1458 711/163 |
| 2018/0025059 A1 | 1/2018 | Batchu et al. | | |
| 2019/0028430 A1 | 1/2019 | Luo | | |
| 2021/0073713 A1 | 3/2021 | Balasubramanian et al. | | |
| 2021/0097191 A1* | 4/2021 | Howell | | G06F 11/327 |
| 2021/0110343 A1* | 5/2021 | Lagneaux | | G06F 18/2321 |

* cited by examiner

FUZZY LOGIC MODELING FOR DETECTION AND PRESENTMENT OF ANOMALOUS MESSAGING

CROSS-REFERENCE TO RELATED APPLICATIONS

This application is a continuation of U.S. patent application Ser. No. 16/996,396 filed Aug. 18, 2020 (now U.S. Pat. No. 11,616,809), the entirety of which is hereby incorporated by reference in its entirety.

TECHNICAL FIELD

The present disclosure relates generally to the detection and presentment of high risk fraud records based on the application of fuzzy logic (e.g., fuzzy-matching) to a plurality of fields associated with communiques sent to various address fields, and fraud-risk data maintained in a fraud-risk database.

BACKGROUND

Users are able to make changes to various account records via mobile applications, in person service, telephonically, etc. In some instances, in order to confirm various changes or otherwise convey status information, a record custodian may provide confirmation mailings (U.S. postage, e-mails, etc.). In some cases, a bad actor may cause the confirmation mailings to be misdirected to prevent a user from receiving the confirmation mailings, so as to mask illicit activity. Moreover, in some cases, a record custodian or a bad actor may inundate a user with a large number of mailings, which the user might construe to be harassing or in error, and which may mask illicit activity if the number of mailings exceeds the number that a user is willing to closely review. Further, because record custodians may maintain data across various databases in various formats, and because individual employees or users may enter information imperfectly or of varied formats, it may be challenging to locate a suspicious address change or excessive mailings to an address because address fields of various data sources may not literally match.

SUMMARY OF THE INVENTION

Various embodiments of the disclosure may relate to a fuzzy logic system for detecting anomalies. The system may comprise a mailings database that may comprise a first mailing identifier associated with a first communique and a second mailing identifier associated with a second communique. The system may comprise a fraud-risk database that may comprise a fraud-risk address and a plurality of address change records. The system may comprise a processor and a memory comprising instructions executable by the processor and configured to cause the system to perform specific functions. The instructions may cause the processor to generate a first match between the fraud-risk address and at least one of: a first address field in the mailings database, or a second address field associated with the plurality of address change records. The first match may be generated by applying fuzzy matching. The instructions may cause the processor to present the first match via a user presentment interface (which may be, or may include, a dashboard). Presenting the first match may comprise comparing the first match to a first threshold, and generating a first presentation of the first match based on the comparing of the first match to the first threshold. Presenting the first match may comprise generating a first threshold adjuster configured to detect adjustments to the first threshold via the user presentment interface. Presenting the first match may comprise detecting, via the first threshold adjuster, a first adjustment of the first threshold to a first adjusted threshold. Presenting the first match may comprise comparing the first match to the first adjusted threshold, and generating a second presentation of the first match based on the comparing of the first match to the first adjusted threshold. The instructions may cause the processor to generate a second match between the first mailing identifier in the mailings database and the second mailing identifier in the mailings database. The second match may be generated by applying fuzzy matching. The instructions may cause the processor to present the second match via the user presentment interface. Presenting the second match may comprise comparing the second match to a second threshold, and generating a third presentation of the second match based on the comparing of the second match to the second threshold. Presenting the second match may comprise generating a second threshold adjuster configured to detect adjustments to the second threshold via the user presentment interface. Presenting the second match may comprise detecting, via the second threshold adjuster, a second adjustment of the second threshold to a second adjusted threshold. Presenting the second match may comprise comparing the second match to the second adjusted threshold, and generating a fourth presentation of the second match based on the comparison of the second match to the second adjusted threshold.

Various embodiments may relate to a fuzzy logic method for detecting anomalies. The method may comprise matching, by a processor, an address field to a physical address in a mailings database using fuzzy logic. The method may comprise determining, by the processor, a number of communiques corresponding to the physical address in the mailings database. The method may comprise comparing, by the processor, the number of communiques to a first threshold. The method may comprise presenting, by the processor, in a dashboard (and/or other user presentment interfaces), the address field matched to the physical address, and a first representation of the number of communiques sent to the physical address, wherein the number of communiques is not less than the first threshold. The method may comprise presenting, by the processor, in the dashboard, a threshold adjustment control configured to detect inputs corresponding to commands to change the first threshold. The method may comprise receiving, via the threshold adjustment control in the dashboard, a command to adjust the first threshold, and determining an adjusted threshold based on the command. The method may comprise presenting, by the processor in the dashboard, the address field matched to the physical address, and a second representation of the number of communiques sent to the physical address, wherein the number of communiques is not less than the adjusted threshold.

Various other embodiments of the disclosure also relate to a fuzzy logic method of detecting anomalies. The method may comprise determining, by a processor, a number of address changes corresponding to a user by fuzzy-matching a plurality of address change records corresponding to the user. The plurality of address change records may be associated with a plurality of address change initiation identifiers. The plurality of address change records may be within an evaluation period. The method may comprise performing, by the processor, a first comparison of the number of address changes to a first threshold. The method may comprise performing, by the processor, a second comparison of the plurality of address change records to a fraud-risk address in a fraud-risk database. The method may comprise presenting, by the processor, in a user presentment interface, at least one of the plurality of address change records based on the first comparison. The method may comprise presenting, by the processor, in the user presentment interface, a fraud-risk database information set associated with the fraud-risk address and the fraud-risk address based on the second comparison.

These and other features, together with the organization and manner of operation thereof, will become apparent from the following detailed description and the accompanying drawings.

DETAILED DESCRIPTION

Figure 1:
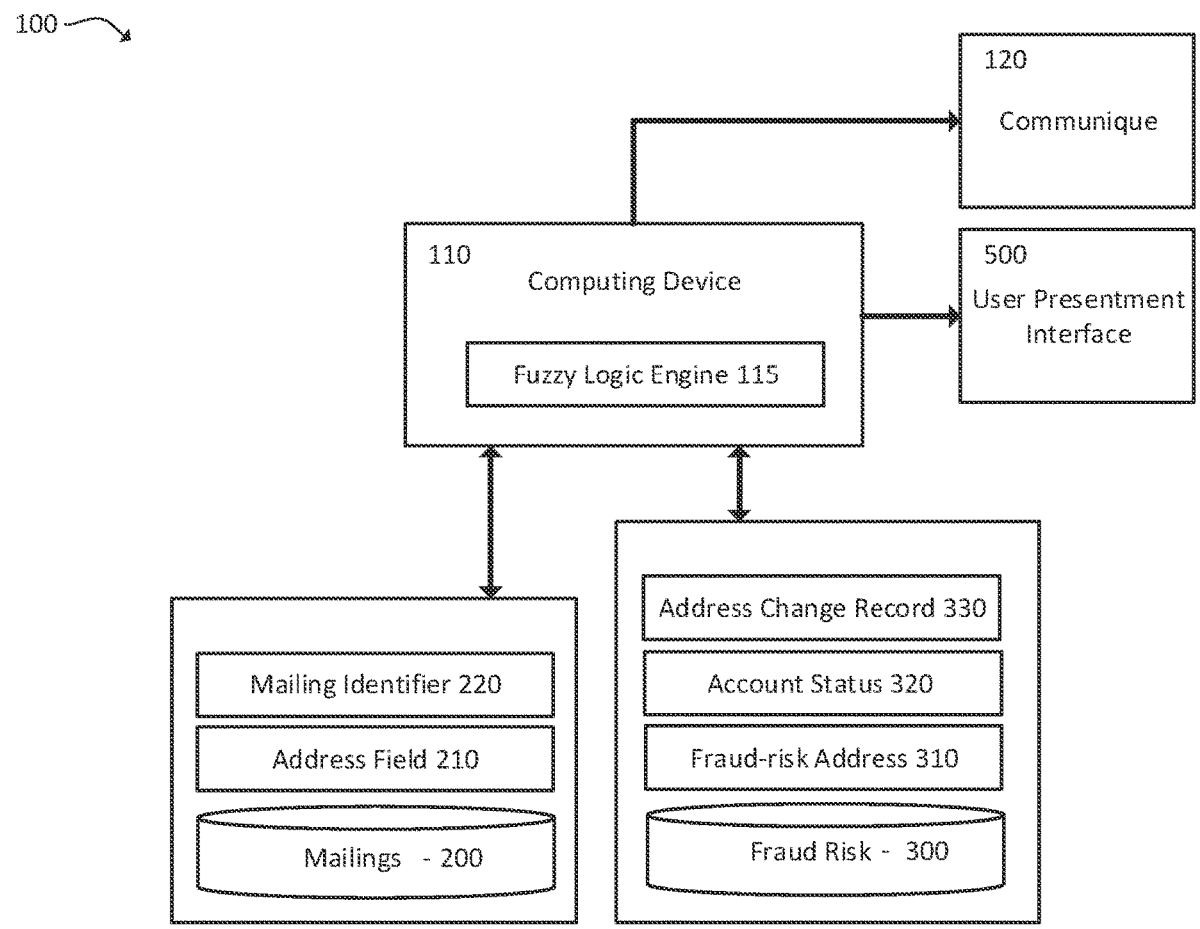
FIG. 1 is a block diagram of an illustrative example system in accordance with various potential embodiments.

Various embodiments described herein relate to systems, methods, and devices for associating a plurality of address fields with a physical address, identifying anomalous mailings associated with that address (especially when a large volume of address changes are associated with that physical address, or when suspicious address change records are associated with an account associated with that address), presenting data concerning those mailings to a user, and presenting processed data to a user through a dashboard and/or other user presentment interfaces such as a chat bot or virtual reality (VR) interface. A mailing may describe something which has already been sent, which is scheduled to be sent in the future, or which is contemplated. An address field may be any data which may route a communique to a physical location. For example, a street address may ultimately route a postal letter to physical house, and an email-address may ultimately route an email to a physical address location in a non-transitory memory (e.g. a user's inbox). Matching a plurality of stored addresses or address fields to each other may comprise matching the addresses or address fields to a physical address, when one or more of the addresses or address fields references a physical address. For example, a plurality of communiques sent by various address fields which may be matched to a single physical address may all be sent to the single physical address.

In some instances, a plurality of address fields may logically map to the same physical address. For example, one address field may refer to an "avenue", another address field may refer to an "ave." and still another address field may refer to an "ay." In some instances, words may be misspelled, or mistaken, or numbers transposed (e.g. 123 Woodridge may be represented as 132 Woodbridge and/or 123 Wood Ridge). Similarly, an email address may be delivered to the same physical address regardless of the capitalization of the email. A plurality of different address fields may appear to relate to the same physical address because of differing representations of middle names and initials, erroneous or missing zip codes, or any other reason.

In various embodiments, fuzzy-matching enables a computing device to match a plurality of address fields to a single physical address (and to compare or match other fields). Fuzzy matching compares data (e.g. character strings) and determines a match score corresponding to the correlation of the strings. In certain embodiments, the comparison may compare the strings character by character for matches. Alternatively or additionally, fuzzy-matching may comprise more advanced heuristics. For example, a computer device configured to perform fuzzy-matching may be able to detect equivalents (e.g. "Bob" and "Robert") despite few shared characters. In some embodiments, fuzzy-matching may be able to determine other differences, such as character transposition, phonetic similarity, case sensitive or insensitive search, whitespace and formatting variation, etc. Fuzzy logic may be applied in a variety of ways to, for example, determine a match score between a plurality of stored text.

In some embodiments, fuzzy matching may provide a match score for each match, such as a percent match. For example, two strings containing identical information may be deemed to be a 100% match, while strings which are similar, but not identical, may be deemed to be a 95% match. In some instances, an address field may be matched to a plurality of physical addresses. For example, an address field comprising the string "132 main street" may match to an address at "132 main st." with a 99% match score, and an address at "123 main st." with a 75% match score. In an instance of an address field further comprising a name, a computing device or a system comprising one or more computing devices (e.g., computing device 110) may determine the match percentage based on the name. For example, if a name corresponding to the "123 main street" address is included in the address field comprising "132 main street," the computing device 110 may determine that the "132 main st." address has an 80% match score, and the "123 main st." address has a 92% match score. The match scores represented as percentages do not necessarily relate to a percent of the string that literally matches; in some cases, the percent match may indicate a confidence of the match, or a ranking system useful in comparing a plurality of matches. Some embodiments may use fuzzy-match scores other than percentages. For example, a computing device may be configured to detect "likely," "probable," and "doubtful" matches, or detect "matches" and "non-matches."

In some instances, the use of an inoperative address may cause a sender to be made aware of a suspicious or anomalous mailing. For example, an email message may receive a "bounce" reply, or postal mail may be returned as undeliverable. Furthermore, the use of the address of an unrelated party may also make the sender aware of a suspicious or anomalous mailing, because a recipient may contact the sender (e.g. to question the propriety of the communique). Therefore, a bad actor may attempt to route any communiques to an address he or she controls, or has access to (e.g. a home address, a P.O. box, a neighbor's address, an email address for which he or she has login credentials, etc.). In some cases, the bad actor may wish to conceal the address he or she controls in order to defray suspicion, avoid an accumulation of evidence, etc. The bad actor may thus be incentivized to cause communiques to be conveyed to an address that he or she can access, but which may avoid a match to existing records. For example, a postal letter may be addressed to an address that the bad actor controls, but with a misspelling, transposed words, alternate name, etc. In the event of an email address, the bad actor may use a misspelling of an address which may not appear suspicious, or various capitalization, various uses of periods in email addresses that will not affect delivery of the email, etc. Therefore, in addition to harmonizing the normal variants of addresses which may exist across data sources, it may be useful to detect (and, in some cases, correct) a plurality of addresses which may indicate suspicious or anomalous activity, such as fraud. In some instances, the existence of multiple variants of a physical address may itself be indicative of suspicious or anomalous activity. The application of match scores to large datasets may be useful to determine records which may not be determinable by either a human or a simple search.

Referring to FIG. 1, a block diagram of an example system 100 enabling detection of anomalous address mailings, according to various potential embodiments, is depicted. The system 100 includes a computing device 110 (e.g. a server of a financial institution or other service provider), which may be implemented using one or more processors connected across a network. Any component of the system 100 may be communicably and operatively coupled to each other over a network to permit the direct or indirect exchange of data, values, instructions, messages, and the like. Some network connections are illustrated by the double-headed arrows in FIG. 1; additional or fewer connections are possible. The system 100 may comprise a plurality of both transitory and non-transitory components (e.g. memories).

Each system or device in the system 100 may include one or more processors, memories, network interfaces, and user interfaces. The memory may store programming logic that, when executed by the processor, controls the operation of the corresponding computing device 110 or devices. The memory may also store data in databases. Some of these databases are more particularly described below, but some implementations may comprise additional or fewer databases. The network interfaces allow the computing device 110 and other system 100 devices to communicate wirelessly or otherwise. The various components of devices in system 100 may be implemented via hardware (e.g., circuitry), software (e.g., executable code), or any combination thereof. Devices and components in FIG. 1 may be added, deleted, integrated, separated, and/or rearranged in various embodiments of the disclosure.

The system 100 may further comprise a communique 120, which may include a mailing delivered to a recipient (or intended for delivery to a recipient). For example, the communique 120 may comprise a monthly or an annual statement, a notification of a new account opening, a notification of a change of address for an account, an advertisement, etc. In some embodiments, the entirety of the communique 120 may be stored in a mailings database 200. In other embodiments, a truncated record may be stored, such as a record of mailing and, in some instances, a link to an account. The mailings database 200 may also include any other data relating to mailings (e.g. account holder mailings). Mailings may include electronic-mail, government posted mail, common carrier or other parcel service, etc. Each mailing may have an associated address field 210. For example, the address field 210 may comprise a mailing address of a house of a user of a financial institution or other entity. In some embodiments, the address field 210 may contain an email address, P.O. box, etc. The mailings database 200 may also include a mailing identifier 220, which may uniquely identify the mailing. In some embodiments, the mailings identifier 220 may comprise detailed information on the context and content of the communique 120. In other embodiments, the mailing identifier 220 may be a row number in the mailings database 200.

The system 100 may also include a fraud-risk database 300. The fraud-risk database 300 may contain information useful in determining fraudulent activity associated with one or more accounts. The fraud-risk database 300 may comprise a fraud-risk address 310. The fraud-risk addresses 310 may include past addresses associated with fraudulent activity, the addresses of employees with access to account information or controls, addresses associated with users who have placed their accounts on hold, addresses of recently deceased persons, etc. The fraud-risk database 300 may also include account status 320 information which may be relevant to an account. For example, if an account is in a hold status, such as due to an account freeze, or a user request, then the status of the account may be relevant to the risk of fraud occurring on the account. In some embodiments, the account status 320 of one account may impact the fraud-risk of another account (e.g. another account which shares a name of an account holder, or an account address).

The fraud-risk database 300 may also include an address change record 330. The address change records 330 may include an original address, a replacement address, a method of change, a change authorization, etc. For example, a change of address made by a user via a mobile application may indicate that the change of address was directly authorized by the user via a mobile application. In some embodiments, the address change records 330 may comprise further information from a user authentication for a mobile application or website. For example, the address change record 330 may contain a record indicating that a user verified login information with a biometric identifier (e.g. a fingerprint) a pin, or two-factor authentication. The address change record 330 may contain further information relating to the change of address, such as a time of the change of address, a confirmation text from a user, or a location of a device associated with the address change record 330 (e.g. a location as identified through a GPS signal, such as geophysical coordinates, or a location derived from an IP ("internet protocol") address).

In some instances, the employee may assist the user with the address change (e.g. over the phone, at a branch location, through an instant message chat function), and the address change record 330 may contain information regarding this assistance, or the employee. Beneficially, this information may determine if a security measure has been compromised, or if an employee may be making unauthorized changes. For example, if a user enters a PIN ("Personal Identification Number") to initiate assistance from a representative, and unauthorized actions are taken (e.g. a change of address, or a balance transfer), such information may be useful in determining that the PIN has been compromised. Likewise, if an employee identifier is associated with an unauthorized transaction then such information may be useful in detecting a pattern of unauthorized transactions by the employee. An employee identifier may comprise any information useful in identifying an employee, such as an employee number, a branch location, a team assignment, a phone number, an email address, etc. In some embodiments, a plurality of employee identifiers may be used to identify an employee. For example, an employee may be identified by the combination of a branch location, a team assignment, a time of a day, and the day of a month.

The computing device 110 may be configured to output data to a user presentment interface 500. In some embodiments, the user presentment interface 500 may output data determined by the computing device 110 without user input. In other embodiments, a user may select information to be presented, or adjust the information presented to the user (such as through iterative real-time feedback or stored user preferences). In some embodiments, the user presentment interface 500, and/or the computing device 110 may be configured to display results based on a threshold. For example, the user presentment interface 500 may be configured to display results only when at least 10 matches are determined. Advantageously, this may reduce the number of results a user must review. For example, if a user wishes to identify an address which may be receiving an excessive number of communiques 120, the user may set a threshold of 25, in order to minimize the number of results the user would receive, while still displaying the most troubling addresses. In some embodiments, a threshold of 1 may be used, which may maximize the results received from the search. Advantageously, this may return a maximum possible number of results, which may aid in a user conducting a thorough review. In some embodiments, the threshold may apply to all available records. In other instances, the threshold may apply to a subset of available records. For example, the user threshold of 25 may apply to all available communiques 120, or may be limited (based on a time period, a security access of the user, an employee assisted change, etc.). In some embodiments, the threshold may be limited to a time period, such as a previous 180 days, a fiscal quarter, or a selected fifteen minute period. In some embodiments, the threshold may be based on communique 120 content. For example, the threshold may apply to security mailings (e.g. address change confirmation, password change confirmations, PIN mailings, etc.). In some embodiments, a threshold may be based on a plurality of data. For example, a threshold could be set for more than 60 total communiques 120 in the last month, or more than 20 address change records 330 ever.

In some embodiments, the computing device 110 may comprise a fuzzy logic engine 115 configured to apply fuzzy logic models to various datasets, such as performing fuzzy matching on various fields from one or more databases. The fuzzy logic engine 115 may, for example, match an address field 210 of the mailings database 200 with an associated address of the fraud-risk database 300. In various embodiments, the fuzzy logic engine 115 may match any other combinations of the same and/or other address fields 210. For example, the fuzzy logic engine 115 may match a first address field 210 of the mailings database 200 with a second address field 210 of the mailings database 200. Fuzzy matching may be used by the computing device 110 to identify an exact match, as well as a similar address field, which may (or may not) correspond to a same physical address. In some instances, the computing device 110 may present every match through the user presentment interface 500. In some embodiments, the user presentment interface 500 may present only matches which meet a match threshold or a match score, a number of matches, a number of communiques 120, etc. Beneficially, this may reduce the number of results which a user must review.

Figure 2A:
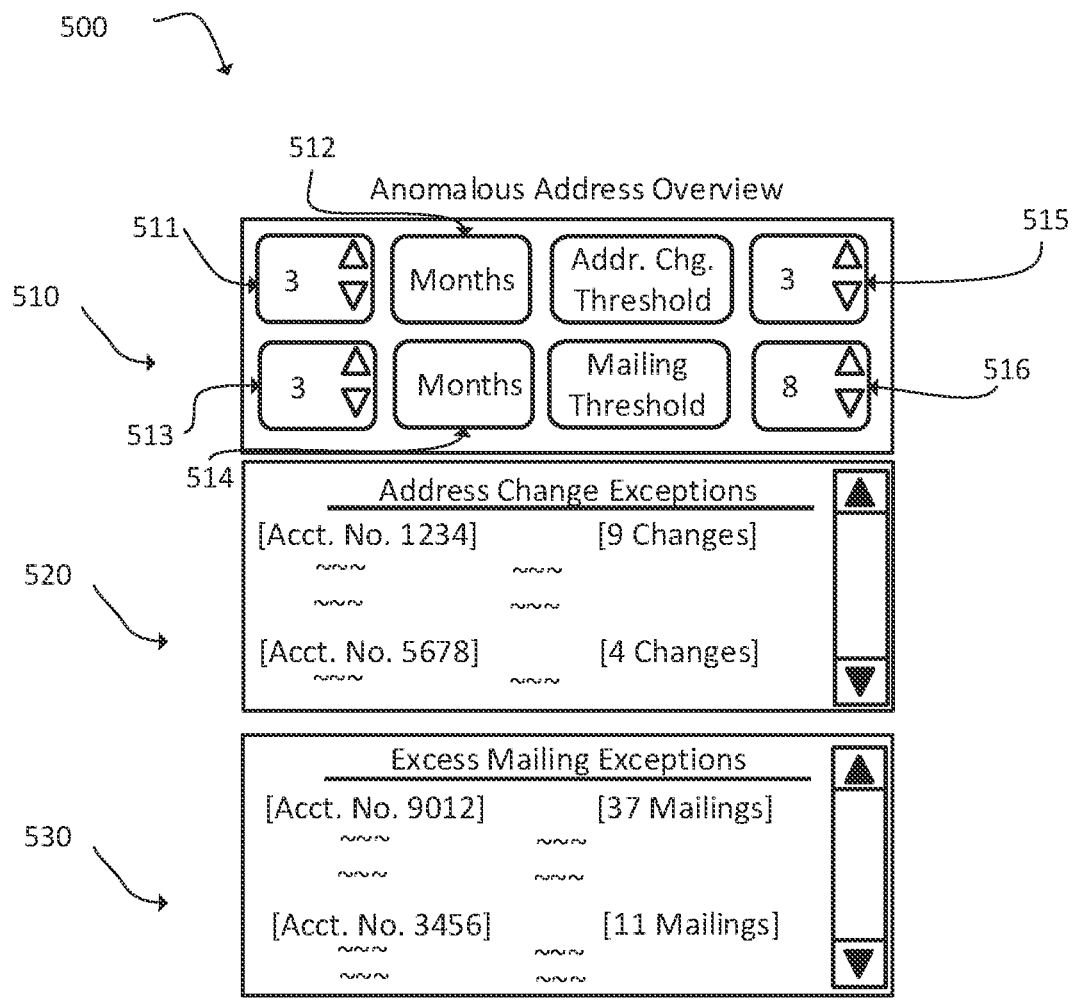
FIG. 2A depicts an example user presentment interface in accordance with various potential embodiments.
Figure 2B:
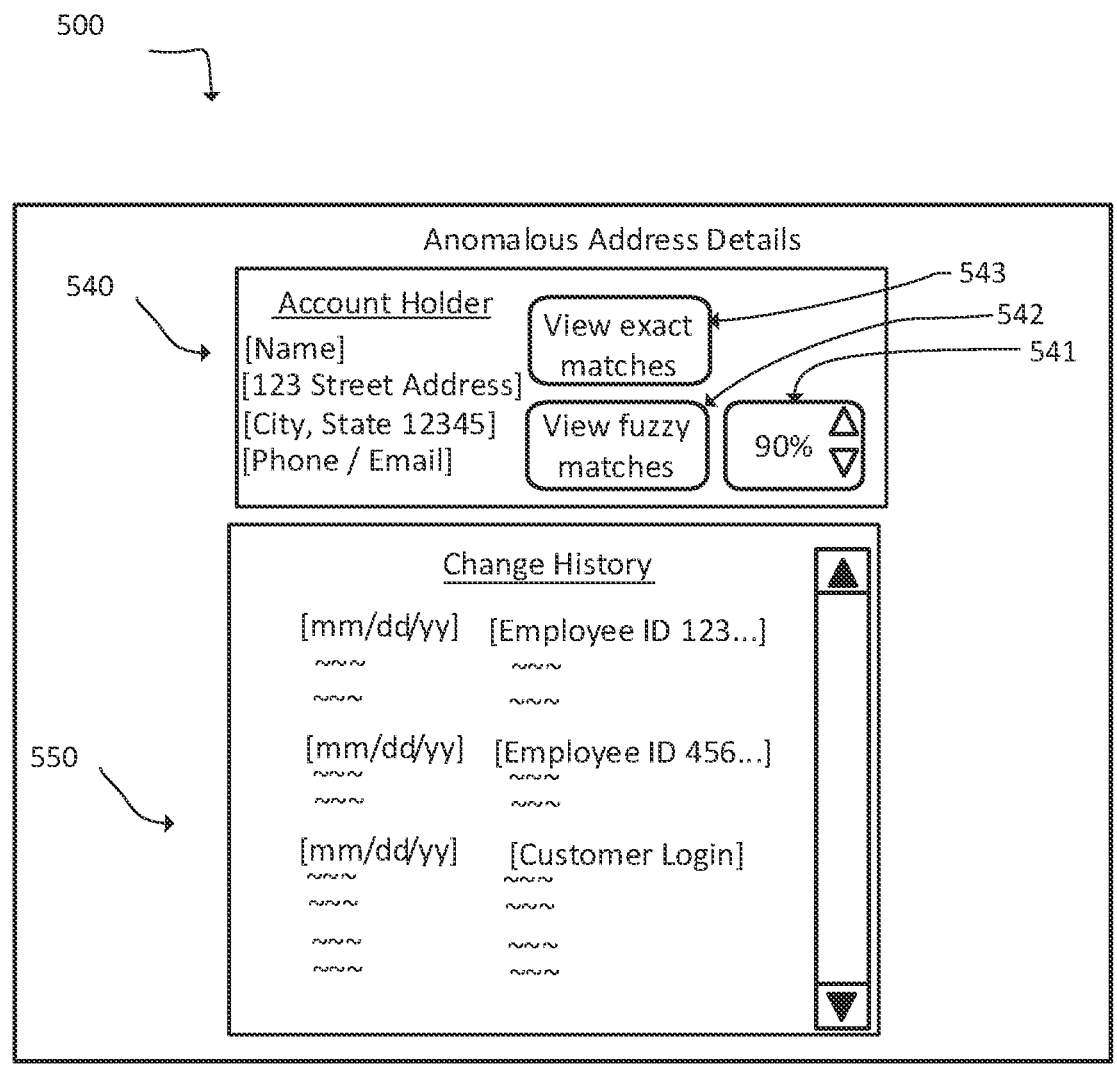
FIG. 2B depicts an alternate display of the user presentment interface depicted in FIG. 2A in accordance with various potential embodiments.

Turning to FIGS. 2A and 2B, illustrative embodiments of a user presentment interface 500 (e.g., a dashboard), which may be capable of presenting information (e.g. information processed by the computing device 110) are depicted. The depicted user presentment interface 500 includes a control frame 510, which may enable a user to control the content, style, detail, etc. of presented information. Some embodiments may include additional, fewer, or no controls. The depicted control frame 510 includes selections associated with address changes and mailings. Controls associated with an address change may include a first numeric selection 511, which, in combination with the first scale selection 512, may allow a user to select the range of address change records 330 they wish to be presented with. For example, a user may select to be presented with address change records 330 from a 3 month period. In some embodiments, a user may select another option, such as 12 days, or 1 year. In some embodiments, the selection of a period may result in address change records 330 being presented for the most recent period (e.g. the last 3 months). In other embodiments, the selection of a period may result in address change records 330 being presented for any period. In some embodiments, a user may select more detailed options, such as a start data and an end date, a business group, an account type, etc. Controls associated with mailings include a second numeric selection 513, and a second scale selection 514. In some embodiments, the controls associated with mailings may behave similarly from the controls associated with address changes. In other embodiments, additional or reduced functionality (or both, combinatorically) may be present.

The depicted control frame 510 further comprises a first threshold adjustment 515 associated with the address changes. In some embodiments, the first threshold adjustment 515 may control the minimum number of address change records 330 that may be displayed, in combination with the first numeric selection 511 and the first scale selection 512. In some embodiments, the computing device 110 (or the presentment interface) may merge a plurality of address change records 330 into an estimated number of address changes. For example, in an embodiment where an address change may result in four address change records 330 (e.g. an address change timestamp, and address change employee number, an original address, and a replacement address) the computing device 110 may treat the four address change records 330 as a single record. Advantageously, this may allow a user to view the number of address changes, and not every record of an address change stored in the system 100. In other embodiments, the system 100 may display every available record independently. Advantageously, this may reduce the risk that the merging of multiple address change records 330 to a single address change may be performed erroneously by the computing device 110, and go undetected by the user.

A second threshold adjustment 516 associated with a number of mailing records is depicted in the control frame 510. The second threshold adjustment 516 may, in combination with the first numeric selection 511 and the first scale selection 512, control the display of mailings in excess of the second threshold adjustment 516. In some embodiments, the second threshold may be based on the total number of communiques 120 sent to a recipient, or the total number of communiques 120 sent to a recipient during a selected time period. In other embodiments, the second threshold (or the first threshold) may be based on an account type, a communique 120 type, a match score, a method of conveyance of a communique 120, etc. In various embodiments of the user presentment interface 500, any combination of thresholds convening time periods, match scores, numbers of mailings, address change records 330, etc. may be implemented in any combination to enable a user to navigate available data.

In some embodiments, a user may harmonize records through the user presentment interface 500. For example, a user may select a record indicating an address field and modify the address field in order to match another address field, to an address standard, etc. In some embodiments, the user may make an unprompted change. In some embodiments, the user presentment interface 500 may prompt a user to correct an address. For example, a user may be prompted to update an address which comprises "5th Av." To "5th AVE" in order to confirm to a standardized abbreviation for avenue. In some embodiments, the system 100 may automatically make some address changes or correction upon of addresses, without the involvement of the user. For example, updating the abbreviation may not require a user to activate the change. In some embodiments, the determination to change an address field may be based on a match score determined by the fuzzy logic system (e.g., fuzzy logic engine 115 of computing device 110) applying a fuzzy logic model. For example, an update threshold may be set to 98% to automatically at least one address where two addresses are related by a match score of not less than 98%. In some embodiments an address change record 330 may be generated by an automatic change and a user may be able to view automatic changes through a control in the control frame 510 of the user presentment interface 500.

The address change exception frame 520 may contain results of the computing device 110 associated with address changes. In some embodiments, the address change exception frame 520 may be based on the control frame 510. For example, the address change exception frame 520 displayed in FIG. 2A may display only records with at least (or, in some embodiments, exceeding) the second threshold (e.g. 3). In some embodiments, the address change exception frame 520 may be displayed according to an account number. In other embodiments, the address change exception frame 520 may displayed according to a physical address, or a name. In some embodiments, the computing device 110 may associate other accounts or names with a matched (e.g. fuzzy-matched) address within a record. For example, the nine changes shown associated with account number 1234 may comprise changes to other accounts that have been matched to the account, such as by a matched address. Other embodiments may provide information differently. For example, address change records 330 or associated information may be presented to a user through an email, a text notification, or a pictographic display.

An excess mailing exceptions frame 530 may contain the results of the computing device 110 associated with excessive mailings. In some embodiments, the excess mailings exceptions frame 530 may be based on the control frame 510. For example, the excess mailings exception frame 530 displayed in FIG. 2A may display only records with at least (or, in some embodiments, exceeding) the first threshold (e.g. 8). Like the address change exception frame 520, the excess mailings exceptions frame 530 may be based on an address, an account number, a name, etc. associated by fuzzing matching and may be provided through a suitable means of presenting information (e.g. an email, a text notification, etc.). Further, any information (e.g. address change records 330, mailings, etc.) may be presented on the user presentment interface 500, which may enable the user to access records related to the information presented. In some embodiments, an overview may list trends, such as a number of exceptions per month, and further allow a user to select (or display absent an explicit user instruction) information trends. In some embodiments, these trends (such as over a predetermined or specified time) may be based on business units, branch locations, associated employees, account types, states, etc. In some embodiments, information may be divided in any manner (such as by the business unit) without displaying a trend over time. In some embodiments, the user presentment interface 500 may restrict the information displayed to a user to the information that a user is able to access. For example, in some embodiments, the user presentment interface 500 may not display access-controlled information to users with certain credentials. In some embodiments, a user may only be permitted to view information from allowed data groups. In some instances, a user may be provided with aggregated data, such as trends per business unit, but not be provided with PII ("personally identifiable information") such as individual account numbers, addresses, or names. In some embodiments, the users may, based on an access credential, be provided with different information, or a different detail of information. In some embodiments, the user presentment interface 500 may display aggregated data, without PII, and allow a user to select more detailed information that may include PII. In some embodiments, the user presentment interface 500 may create and maintain a record of access to detailed information, such as PII, when accessed by a user. Some embodiments may prompt the user to acknowledge they are requesting PII (which may provide warnings about the limitations of use of the PII, that access to the information by the user will be logged, etc.).

FIG. 2B depicts an example detailed view based on an address field 210 or an account holder. In some embodiments, the screen may be accessed from a summary view. In some embodiments, the screen may be accessed directly, such as by a search, or an account selection presented by the user presentment interface 500. The depicted user presentment interface 500 includes a detail control frame 540, which may include account holder information comprising a name and an address. In some embodiments, the name and address may be searchable, or changeable by the user. For example, an input device (such as a keyboard, a touchscreen, a serial connection, or an application programming interface to an executable program) may allow a user to search accounts based on a name field, a listed address, etc. In some embodiments, the name and address may be displayed, without search functionality. In some embodiments, the user name or address (or any other information displayed by the user presentment interface 500) may be edited through a view of the user presentment interface 500. For example, following a fuzzy search, a result of "John Smiith" may be returned as a likely match with a "John Smith" (e.g. by a shared address and social security number). The user may, prompted or unprompted, remove an extraneous 'i'.

The detail control frame 540 may further comprise a match score threshold adjustment 541 which may allow a user to adjust the match score threshold sensitivity, which may result in the display of an additional (or fewer) datum. For example, a user may be searching for address change records 330 associated with an account holder. However, few or no address records may be provided by the user presentment interface 500. In some embodiments, this may be because the fuzzy-matching has correctly matched a relevant account, but the match score may be less than the match score threshold. Allowing a user to adjust the match score threshold sensitivity downward may, advantageously, cause the user presentment interface 500 to display additional matches. In some embodiments, a user may be inundated with a large number of irrelevant data records. Beneficially, allowing a user to increase the match score threshold sensitivity may allow a more targeted review of data records by the user. In some embodiments, the detail control frame 540 may include a results button 542 to display the results of the search. In some embodiments, the user detail control frame 540 may be limited to exact matches. For example, this may be accomplished through an exact results button 543. In some embodiments, setting the match score threshold (e.g. setting a percent to 100% or a setting to "exact match") may also limit the search selection to exact matches.

The detailed view may also include a detail frame 550. The detail frame 550 may contain records corresponding to the address details. The detail frame 550 depicted in FIG. 2B includes details associated with address change records 330. For example, the depicted detail frame 550 contains a date, (e.g. date time group) and a method of an address change. For example, an address change record 330 associated with an employee (e.g. at a branch location, or telephonically) may include an employee identifier such as an employee identification code. An address change record 330 associated with a user's mobile device may include a time of the change, a method of authorization of the change, etc. Other embodiments of detail frames 550 may comprise other information. For example, some embodiments may include a detail frame 550 associated with the mailing of the communique 120, and may include information such as a mailing date, mailing contents, an address field 210, a mailing identifier 220, an account number, a name, etc. Some embodiments may comprise information from the fraud-risk database 300. For example, a detail screen may be based on a fraud-risk address 310. Such a detail frame 550 may include address change records 330 associated with the fraud-risk address 310, accounts associated with the fraud-risk address 310, names associated with the fraud-risk address 310, etc. In some embodiments, a threshold may be associated with the fraud-risk address 310. For example, if a user believes that having more than five names, or two mortgages associated with the fraud-risk address 310 (e.g. an employee address) is suspicious, then the user may set a threshold of five names and two mortgages. In some embodiments, a threshold may be based on details of an address change record 330. For example, a user may believe that address change records 330 which indicate an address was initiated by a user, and that login authorization was granted based on biometric information may be unlikely to be associated with fraud unless occurring more than 10 times in a month, and that an address change record 330 that indicated an employee changed an account, based on a telephonic call, to a fraud-risk address 310 associated with the employee may indicate potential fraud even when occurring once. The user may set a threshold for biometric authorized address change records 330 to eleven, and telephonic initiated address change records 330 to one.

In some embodiments, queries may become complicated, and a user may not wish to enter controls through a detail control frame 540, or it may be impractical to do so. Moreover, it may be desirable to allow electronic access to the user presentment interface 500 (e.g. to enable electronic processing of data). In such embodiments, the user presentment interface 500 may include a structured query input. For example, the user presentment interface 500 may receive a very detailed query (e.g. a SQL "structured query language" search, python scripts, or another suitable querying method) which includes time, location, address, and various thresholds. In some embodiments, the user presentment interface 500 may include protections to avoid a user altering data through the user presentment interface 500 (e.g. through a SQL injection attack). Other embodiments may enable mechanisms for searching and displaying information, such as through various database and spreadsheet tools.

In some embodiments, an indication of past search history or entries may be included in the information displayed by the user presentment interface 500, or otherwise linked to a data record, such as by a flag or text notation entry. In some embodiments, this indication may be made available to a user or impact the information presented to a user. For example, a 'flag' indication that an address field 210 has been investigated and deemed non-fraudulent may cause the address field 210 to be shown as green, or to be accompanied by an icon (e.g. a check mark, an asterisk, or a happy face emoji). In some embodiments, the icon may provide a link to more detailed information, such as the time the indication was added, the authorizing account that added the indication, etc. For example, a fraud-risk address 310 associated with an employee may be associated with fourteen car loan accounts. A user may view this information, and upon investigation learn that the accounts are proper (e.g. the accounts may be associated with an automobile enthusiast, or a large family). The user may input an indication through the user presentment interface 500 based on the investigation. For example, the user may input a bit-flag that may prevent the address from appearing on future searches, or may associate a text entry explaining the results of the investigation with an associated address field 210.

Figure 3:
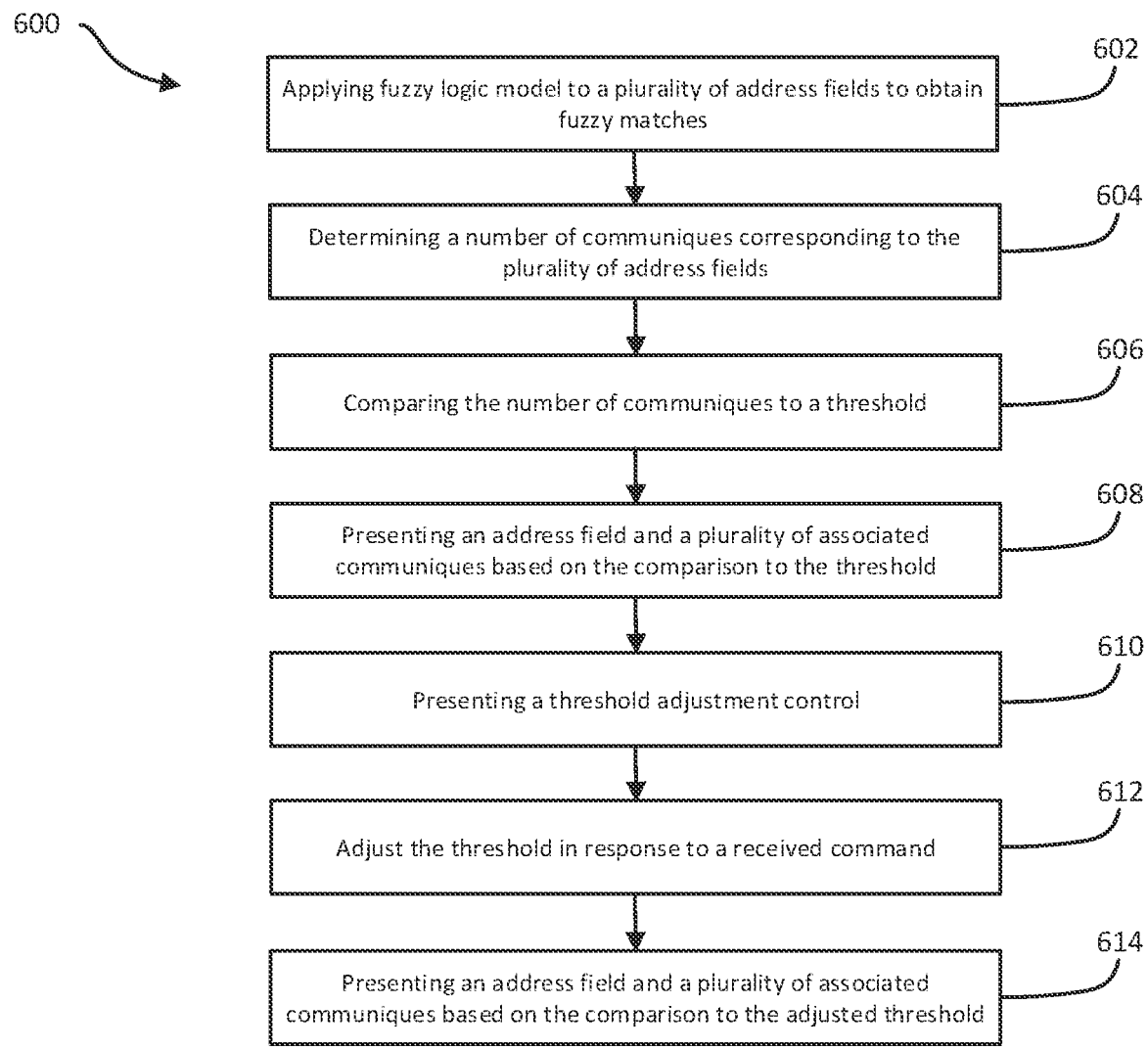
FIG. 3 is a flow diagram depicting an illustrative method in accordance with various potential embodiments.

FIG. 3 depicts a flow diagram consistent with methods 600 of the example embodiments. The methods 600 may include applying a fuzzy logic model to match a plurality of address fields 210 at 602. The fields may be matched using fuzzy logic (e.g. "fuzzy-matching"). Where any of the matched address fields 210 are associated with a physical address, fuzzy matching the address fields 210 may comprise matching the address fields 210 to the physical address. At 604, a number of communiques 120 corresponding to the physical address in step 604 is determined. For example, if a combined fifteen communiques 120 have been sent to twelve unique address fields 210, which have been matched together (using fuzzy matching, at step 604), and if any one of the twelve unique address fields 210 is associated with a physical address, then that physical address may be determined to have fifteen communiques 120 associated with it.

At step 606, the number of communiques 120 may be compared to a first threshold. In some embodiments, the first threshold may be a fixed number, such as eight. In such an embodiment, the number may be compared to the first threshold and be determined to exceed the threshold. In other embodiments, the first threshold may depend on the content of the data being compared. For example, some address fields 210 may be categorized as higher risk, and require a lower number of communiques 120 to exceed the first threshold, or an address may be identified as high volume (e.g. a title company) and a higher number of communiques 120 may be required to exceed the threshold. In some embodiments, the threshold may vary according to the communique 120 type. For example, although a trust company may receive fifty loan document communiques 120 in a month without exceeding the first threshold, receiving thirty advertisements in a month may exceed it.

At step 608, the user presentment interface 500 may display an address field 210 representing a physical address and a representation of the communiques 120 sent to the address where the number of communiques 120 is not less than the first threshold. In some embodiments, the representation of the communiques 120 may contain detailed information relating each of the communiques 120. In some embodiments, the representation of the communique 120 may be limited to a number of communiques 120, or a Boolean indication that the number of communiques 120 exceeds a threshold. In some embodiments, the address field 210 may display a full address. In other embodiments, the address field 210 may contain an identifier code, or linkage to the physical address. In some embodiments, the user presentment interface 500 may display combined results for a plurality of physical addresses (e.g. per state, per business unit, etc.), and may, upon selection, display one or more of the plurality of single addresses.

At 610, the user presentment interface 500 presents a threshold adjustment control such as a button, an entry field, an interactive slider, etc. Detection of a user entry, via an input device or mechanism such as a touchscreen, that indicates selection or other interaction with the control (e.g., to adjust the threshold), may trigger a corresponding response (e.g., a change in the threshold that is applied). At 612, the user presentment interface 500 adjusts the first threshold in response to a command received from the user. For example, a user may wish to see additional results, and lower the threshold, raise the threshold, etc. In embodiments which use thresholds that are more advanced than a static number, a user may make any changes to any portion of the first threshold. In some cases, the user may wish to adjust the threshold by pre-selecting or entering a new text-based description of the first threshold (such as a SQL query). At 614, the user presentment interface 500 presents data to the user based on the adjusted threshold. In some embodiments, the data may be displayed in a report format, a graphical format, through a database or spreadsheet program, etc. In some embodiments, the results may be displayed via an email, a text message, etc. References to a user and the user may not necessarily refer to the same user. For example, an initial dataset may be displayed or otherwise presented via a first device of a first user, a second device of a second user may be used to adjust a threshold (such as through interaction with a control in a graphical user interface) using an input device or mechanism (e.g., a touchscreen, microphone, etc.), and a third device of a third user may display or otherwise present (e.g., via a display screen, audio speaker, etc.) information based on the adjusted threshold.

Figure 4:
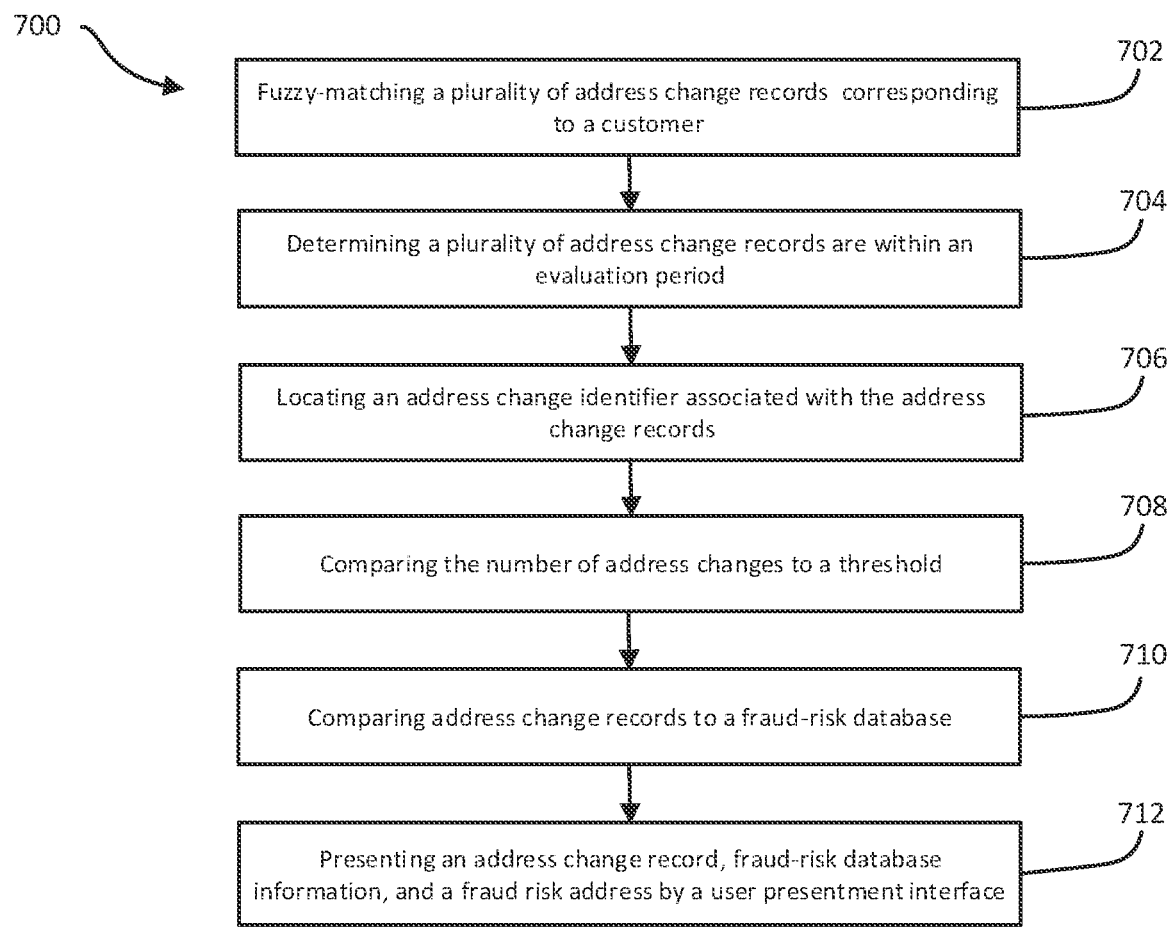
FIG. 4 is another flow diagram depicting an illustrative method in accordance with various potential embodiments.

Turning to FIG. 4, a flow diagram for other methods 700 of various potential embodiments is depicted. At 702, a plurality of address change records 330 which correspond to a physical address may be matched using fuzzy-matching. At 704, the plurality of address change records 330 are determined to be within an evaluation period. In certain embodiments, the evaluation period may be based on the date of an entry of the address change records 330. In some embodiments the evaluation period may be based on an effective date of the address change records 330. For example, an address change record 330 may be entered on January 5, with an effective date of February 5. In some embodiments, the address change records 330 may be within an evaluation period of, for example, January. In some embodiments, the address change records 330 may be within an evaluation period of, for example, February. In some embodiments, the address change records 330 may be within both evaluation periods. In some embodiments, a user may access a control to detail what portions or associations of an address change records 330 may be within an evaluation period.

At 706, an address change identifier may be located which is associated with the address change record 330. For example, an employee identifier or user two-factor authentication code may be associated with an address change record 330. Because the steps of the disclosed method 700 may be performed in any order, it may be unnecessary to perform every step on every record. For example, if step 704 is performed before step 706, it may not be necessary to locate an associated address record for address change records 330 which are not within the evaluation period. The performance of steps 702, 704, and 706 may determine a number of address changes within an evaluation period. For example, if every address change is associated with an address change identifier comprising a unique identification number, then the determining the number of address changes from the address change records 330 may be performed by identifying the number of the unique identification numbers during the evaluation period. In other embodiments, the number of address changes may be determined by evaluating the methods and content of address change records 330. For example, a user may generate a first address change record 330 by changing his or her address through a mobile application, and thereafter enter a branch location to change his or her address a second time, where the employee may generate a second address change record 330. Thus the (at least) two address change records 330 may be correlated to two address changes. Alternatively, a user may generate a first address change record 330 by attempting (but failing, e.g. due to a security hold) to change his or her address through a mobile application, and thereafter enter a branch location to complete the address change, where the employee may generate a second address change record 330. Thus the (at least) two address change records 330 may be correlated to only one address change.

At 708, the number of address changes (determined from the address change records 330) are compared to a threshold. In some embodiments, the threshold may be editable or selectable by the user, and may be a fixed numeric threshold, or a more configurable threshold. At 710, the address records may be compared to a fraud-risk address 310. For example, fuzzy-logic may be applied to find a match between address change record 330 information, and information in the fraud-risk database 300. For example, the address may be an employee address, or adjacent to an employee address (which the employee may be determined to have access to). In some embodiments, the fraud database may comprise rules-based parameters which do not specify particular addresses (e.g. all post office boxes may be marked as likely fraud addresses). In some embodiments, particular addresses (such as addresses previously involved in fraudulent activity, or employee addresses) may be included in the fraud-risk database 300.

At 712, the user may be presented with an address field associated with the physical address matched with the address changes, a matched fraud-risk address 310, and information from the fraud-risk database 300. For example, the user may be provided with a physical address associated with an address change which occurred at a retail banking location after the retail bank was closed. The further information associated with the fraud-risk database 300 may comprise an employee identifier associated with the change as well as the branch location and time.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for providing the overall system or portions of the embodiments might include general purpose computing in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A fuzzy logic system for detecting anomalies, comprising:
   a mailings database comprising a plurality of communiques;
   a fraud-risk database comprising a fraud-risk address and a plurality of address change records; and
   a processor configured to:
      provide a user presentment interface comprising an interactive element corresponding to a match sensitivity for a fuzzy matching algorithm;
      generate, by applying fuzzy matching according to the match sensitivity provided via the interactive element of the user presentment interface, a first match score between the fraud-risk address and at least one of: a first address field in the mailings database, or a second address field associated with the plurality of address change records, the first match score indicating a degree to which the fraud-risk address matches the first address field or the second address field; and
present the first match score via the user presentment interface, wherein presenting the first match score comprises:
generating a first presentation of the first match score based on the match sensitivity, the first presentation comprising data of a first subset of the plurality of communiques identifying the fraud-risk address, a number of communiques selected for inclusion in the first subset determined based on the match sensitivity and a first time period selected via the user presentment interface;
generating a first threshold adjuster configured to detect adjustments to adjust the match sensitivity via the user presentment interface, the first threshold adjuster different from the interactive element;
detecting an interaction with the first threshold adjuster, causing a first adjustment of the match sensitivity to a first adjusted threshold having a predetermined value; and
comparing the first match score to the first adjusted threshold, and generating a second presentation of the first match score based on the comparing of the first match score to the first adjusted threshold, the second presentation comprising data of a second subset of the plurality of communiques identifying the fraud-risk address, the second subset selected based on the first adjusted threshold.

2. The system of claim 1, wherein the first match score is between the fraud-risk address and the first address field of the mailings database.

3. The system of claim 1, wherein the first match score is between the fraud-risk address and the second address field associated with the plurality of address change records.

4. The system of claim 1, wherein the first threshold match sensitivity is a fixed numeric threshold.

5. The system of claim 1, the processor further configured to:
generate, by applying fuzzy matching, a second match score between a first mailing identifier in the plurality of communiques in the mailings database and a second mailing identifier in the plurality of communiques in the mailings database; and
present the second match score via the user presentment interface.

6. The system of claim 5, the processor configured to compare the second match score to a second threshold, and generate a third presentation of the second match score based on the comparing of the second match score to the second threshold.

7. The system of claim 6, the processor configured to generate a second threshold adjuster configured to detect adjustments to the second threshold via the user presentment interface, and detect, via the second threshold adjuster, a second adjustment of the second threshold to a second adjusted threshold.

8. The system of claim 7, the processor configured to compare the second match score to the second adjusted threshold, and generate a fourth presentation of the second match score based on the comparison of the second match score to the second adjusted threshold.

9. The system of claim 5, wherein the system is configured to cancel or place a hold on generation of a mailing communique based on the second match score.

10. The system of claim 7, wherein at least one of the first adjusted threshold or the second adjusted threshold is set to display every available match score.

11. A fuzzy logic method for detecting anomalies, comprising:
providing a user presentment interface comprising an interactive element corresponding to a match sensitivity for a fuzzy matching algorithm;
generating, by applying fuzzy matching according to the match sensitivity provided via the interactive element of the user presentment interface, a first match score between a fraud-risk address in a fraud-risk database and at least one of: a first address field in a mailings database, or a second address field associated with a plurality of address change records in the fraud-risk database, the mailings database comprising a plurality of communiques, the first match score indicating a degree to which the fraud-risk address matches the first address field or the second address field; and
presenting the first match score via the user presentment interface, wherein presenting the first match score comprises:
generating a first presentation of the first match score based on the match sensitivity, the first presentation comprising data of a first subset of the plurality of communiques identifying the fraud-risk address, a number of communiques selected for inclusion in the first subset determined based on the match sensitivity and a first time period selected via the user presentment interface;
generating a first threshold adjuster configured to adjust the match sensitivity via the user presentment interface, the first threshold adjuster different from the interactive element;
detecting an interaction with the first threshold adjuster, causing a first adjustment of the match sensitivity to a first adjusted threshold having a predetermined value; and
comparing the first match score to the first adjusted threshold, and generating a second presentation of the first match score based on the comparing of the first match score to the first adjusted threshold, the second presentation comprising data of a second subset of the plurality of communiques identifying the fraud-risk address, the second subset selected based on the first adjusted threshold.

12. The method of claim 11, wherein the first match score is between the fraud-risk address and the first address field of the mailings database.

13. The method of claim 11, wherein the first match score is between the fraud-risk address and the second address field associated with the plurality of address change records.

14. The method of claim 11, wherein the match sensitivity is a fixed numeric threshold.

15. The method of claim 11, further comprising:
generating, by applying fuzzy matching, a second match score between a first mailing identifier in the plurality of communiques in the mailings database and a second mailing identifier in the plurality of communiques in the mailings database; and
presenting the second match score via the user presentment interface.

16. The method of claim 15, wherein presenting the second match score comprises comparing the second match score to a second threshold, and generating a third presentation of the second match score based on the comparing of the second match score to the second threshold.

17. The method of claim 16, wherein presenting the second match score further comprises:
generating a second threshold adjuster configured to detect adjustments to the second threshold via the user presentment interface; and
detecting, via the second threshold adjuster, a second adjustment of the second threshold to a second adjusted threshold.

18. The method of claim 17, wherein presenting the second match score further comprises comparing the second match score to the second adjusted threshold, and generating a fourth presentation of the second match score based on the comparison of the second match score to the second adjusted threshold.

19. The method of claim 15, wherein the system is configured to cancel or place a hold on generation of a mailing communique based on the second match score.

\* \* \* \* \*